United States Patent
Fujimura et al.

(10) Patent No.: US 6,371,834 B1
(45) Date of Patent: Apr. 16, 2002

(54) METHOD FOR PREPARING GLASS SUBSTRATE FOR MAGNETIC RECORDING MEDIUM

(75) Inventors: Akio Fujimura; Hiroshi Miura, both of Saitama (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/574,245

(22) Filed: May 19, 2000

(51) Int. Cl.$^7$ ................................................. B24B 1/00
(52) U.S. Cl. ............................ 451/41; 451/36; 451/60; 451/447
(58) Field of Search ............................ 451/36, 41, 60, 451/447

(56) References Cited

U.S. PATENT DOCUMENTS 5,738,800 A * 4/1998 Hosali et al. .................. 216/99
5,766,279 A * 6/1998 Ueda et al. .................... 51/308
6,043,961 A * 3/2000 Yamamoto et al. ......... 360/131

* cited by examiner

Primary Examiner—Joseph J. Hail, III
Assistant Examiner—Shantese McDonald
(74) Attorney, Agent, or Firm—Young & Thompson

(57) ABSTRACT

A method for preparing a glass substrate for use in making a magnetic recording medium is herein disclosed and the method is characterized in that an abrasive liquid containing a $CeO_2$-base abrasive having an average particle size, $D_{50}$, of not more than 0.5 μm in an amount of not more than 1% by mass and an abrasive cloth are used in a step for final polishing the glass substrate for magnetic recording media. The method permits easy preparation of a glass substrate for use in making a magnetic recording medium, which has a uniform surface, is substantially free of any surface defect and has a smooth surface having an extremely low surface roughness.

16 Claims, No Drawings

METHOD FOR PREPARING GLASS SUBSTRATE FOR MAGNETIC RECORDING MEDIUM

BACKGROUND OF THE INVENTION (a) Field of the Invention

The present invention relates to a method for preparing a glass substrate for use in making a magnetic recording medium and more particularly to a method for preparing a glass substrate for use in making a magnetic recording medium, which has a uniform surface, does not substantially have any surface defect and has a smooth surface having an extremely low surface roughness.

(b) Description of the Prior Art

There has been tried to reduce the flying height in order to improve the recording density of recording media in response to a substantial increase in the storage capacity of the magnetic disk recording unit. Thus, there has been required for the development of a substrate for use in making a magnetic recording medium, which is excellent in the surface smoothness and has a substantially small number of surface defects, in order to reduce the flying height.

Conventionally, a substrate prepared by plating an aluminum alloy with Ni—P and then subjecting the principal face thereof to a multi-stage polishing operation has mainly been employed as a substrate for use in making a magnetic recording medium, which is excellent in the surface smoothness.

However, a magnetic disk recording unit has recently been adopted even in a portable personal computer such as a notebook-sized personal computer and this accordingly requires the development of a substrate for magnetic recording media capable of withstanding any impact encountered during carrying such a portable personal computer. In addition, the substrate for magnetic recording media should be rotated at a high speed of not less than 10000 rpm to increase the response speed of the magnetic disk recording unit and this correspondingly requires the use of a substrate for magnetic recording media having high strength. Thus, a glass substrate has been used as such a substrate satisfying the foregoing various requirements.

As such a glass substrate for magnetic recording media, there have principally been used a tempered glass substrate whose strength is enhanced by surface chemical strengthening and a crystallized glass substrate obtained by maintaining a glass substrate, which is prepared by melting and molding a raw glass material, at a high temperature ranging from 600 to 800° C. over a long period of time to thus partially separate out crystalline phases therein.

The surface chemical strengthened glass substrate is a glass substrate obtained by, for instance, grinding and polishing a glass substrate capable of being chemically surface-strengthened (hereunder referred to as "chemically surface-strengthenable glass substrate") and obtained by melting and molding a raw glass material and then immersing the chemically surface-strengthenable glass substrate in a molten salt of, for instance, sodium nitrate or potassium nitrate to thus form a compressive stress-containing layer on the surface thereof and to in turn improve the breaking strength thereof. Moreover, the crystallized glass substrate may be a glass substrate obtained by, for instance, allowing amorphous glass prepared by melting and molding a raw glass material to stand at a high temperature ranging from 600 to 800° C. over a long period of time to give a mixed phase in which 40 to 80% of a crystalline phase and 20 to 60% of an amorphous phase coexist.

If such a crystallized glass substrate or a chemically surface-strengthenable glass substrate is polished according to the well-known technique or using a soft abrasive cloth such as suede-type one along with an abrasive liquid containing a $CeO_2$-base abrasive having an average particle size of about 0.5 to 2 $\mu$m in an amount of about several % by mass, in the process for grinding and polishing, in particular, final polishing the glass substrate, however, brush mark-like linear unevenness is generated due to the use of the abrasive cloth and therefore, only glass substrates having uneven surface are obtained. Moreover, the lowest possible surface roughness accomplished by this technique is on the order of 3.5 Å for the chemically surface-strengthenable glass substrate and about 4.5 Å for the crystallized glass substrate. Consequently, it has been quite difficult to achieve a surface roughness of not more than 3 Å, which is required for the glass substrate for use in making magnetic recording media.

SUMMARY OF THE INVENTION

It is thus an object of the present invention to provide a method for efficiently preparing a glass substrate for use in making a magnetic recording medium whose polished surface is quite uniform, which is substantially free of any surface defect and has a smooth surface having an extremely low surface roughness.

The inventors of this invention have conducted various studies to achieve the foregoing object, have unexpectedly found that a glass substrate for use in making a magnetic recording medium, which has a uniform surface free of any brush mark-like linear unevenness, which is substantially free of any surface defect and which has a surface roughness of not more than 3 Å can easily be prepared by polishing a raw glass substrate using an abrasive cloth, preferably a hard abrasive cloth of a foamed polyurethane in combination with an abrasive liquid which contains an ultrafine $CeO_2$-base abrasive in a quite low concentration in a final polishing step, after lapping the glass substrate to a desired thickness according to the well-known method and, if necessary, polishing the substrate and have thus completed the present invention.

According to the present invention, there is thus provided a method for preparing a glass substrate for use in making a magnetic recording medium, which is characterized in that an abrasive liquid containing a $CeO_2$-base abrasive having an average particle size, $D_{50}$, of not more than 0.5 $\mu$m in an amount of not more than 1% by mass and an abrasive cloth are used in a step for final polishing the glass substrate.

DESCRIPTION OF THE PREFERRED EMBODIMENTS

The present invention will hereunder be described in more detail.

The glass substrates, to be processed, used in the method for preparing a glass substrate for use in making a magnetic recording medium are not restricted to specific ones insofar as they have sufficient strength required for the glass substrate for magnetic recording media or they can acquire sufficient strength required for the glass substrate through any surface chemical strengthening treatment. However, it is preferred to use crystallized glass substrates and chemically surface-strengthenable glass substrate while taking into consideration the present situation of the techniques.

The abrasive used in the final polishing step of the method according to the present invention comprises $CeO_2$-base fine particles whose average particle size: $D_{50}$ is not more than 0.5 $\mu$m, preferably not more than 0.3 $\mu$m and more preferably not more than 0.2 µm. This is because if the glass substrate is polished using an abrasive liquid containing an abrasive having an average particle size of higher than 0.5 µm, the resulting glass substrate has an increased surface roughness. Therefore, the use of such an abrasive liquid cannot provide any desired glass substrate, which is substantially free of surface defects and has a smooth surface having an extremely low surface roughness.

As the $CeO_2$-base abrasive usable in the final polishing step of the method of the present invention, there may be listed, for instance, high purity $CeO_2$, mixtures of $CeO_2$ with oxides of rare earth elements, mixture of $CeO_2$ and $SiO_2$, solid solutions consisting of cerium oxide and silicon oxide such as those disclosed in U.S. Pat. No. 5,766,279. Such a solid solution can be commercially available in the form of desired ultrafine particles and can particularly suitably be used in the method of the present invention because of their excellent dispersibility in water. Such a solid solution preferably consists of 100 parts by mass of cerium oxide and 0.1 to 10 parts by mass of silicon oxide.

The abrasive liquid used in the final polishing step in the production method according to the present invention comprises not more than 1% by mass and preferably not more than 0.5% by mass of the foregoing $CeO_2$-base abrasive. If the glass substrate is polished using an abrasive liquid containing such a $CeO_2$-base abrasive in an amount of higher than 1% by mass, the resulting glass substrate has an increased surface roughness. Therefore, the use of such an abrasive liquid cannot provide any desired glass substrate, which is substantially free of surface defects and has a smooth surface having an extremely low surface roughness. The reason why the surface roughness of the glass substrate is extremely low when the substrate is polished using an abrasive liquid whose $CeO_2$-base abrasive concentration is very low has not yet clearly been elucidated at this stage, but it would be believed that the concentration of an abrasive required and effective for the polishing is in fact very low and that the presence of an excess of an abrasive in the abrasive liquid may adversely affect the surface roughness.

In the method of the present invention, the resistance to polishing and resistance to processing are high because of the low concentration of an abrasive in the abrasive liquid. However, these resistances can be reduced by the incorporation of a polymeric additive and/or a surfactant into the abrasive liquid like the conventional technique. Examples of such polymeric additive usable herein are celluloses and glycerin and examples of such surfactants usable herein are anionic, cationic and nonionic surfactants, with fatty acid type surfactants (soap) being preferably used. The use of these additives not only permits the reduction of these resistances, but also makes, more easier, the production of a glass substrate having a smooth surface and an extremely low surface roughness.

In the final polishing step of the method according to the present invention, a glass substrate is polished using a conventional double-sided polishing machine and a known abrasive cloth. The abrasive cloth is not particularly restricted to any specific one, but it is preferred to use a rather hard abrasive cloth in order to enhance the mechanical action among the mechano-chemical actions during polishing. As such rather hard abrasive cloths, preferred are hard abrasive cloths made of foamed polyurethanes which are conventionally used in a coarse polishing (primary polishing) step. The hardness of the hard abrasive cloth of a foamed polyurethane is classified into several stages and those classified into any stage may successfully be used in the present invention. However, preferably used are those having a higher hardness from the viewpoint of preventing any corner slope of the glass substrate. Moreover, it is preferred to form grooves having a width of 1 mm and a depth of 1 mm at intervals of 30 to 50 mm on the polishing side of the hard abrasive cloth to make the flow of the abrasive liquid easy. Furthermore, the thickness of the abrasive cloth preferably ranges from about 0.5 to 1.5 mm.

As has been discussed above, if a glass substrate is polished using a suede type soft abrasive cloth and an abrasive liquid containing a $CeO_2$-base abrasive having an average particle size of about 0.5 to 2 µm in an amount of about several percentages, brush mark-like linear unevenness having directional qualities is formed because of the polishing with an abrasive cloth and such a polishing operation may only provide a glass substrate having a non-uniform surface. On the other hand, the occurrence of such brush mark-like linear unevenness due to the use of such an abrasive cloth can be suppressed by the use of an abrasive liquid containing not more than 1% by mass of a $CeO_2$-base abrasive having an average particle size, $D_{50}$, of not more than 0.5 µm. Moreover, any occurrence of such brush mark-like linear unevenness due to the use of such an abrasive cloth can be further inhibited by the simultaneous use of such an abrasive liquid and a hard abrasive cloth of a foamed polyurethane as specified above. Such brush mark-like linear unevenness due to the use of such an abrasive cloth comprises extremely small projections which cannot be recognized by the usual visual inspection of the appearance of the glass substrate, but they can visually recognized if a magnetic film is deposited thereon. In this respect, the brush mark-like linear unevenness due to the use of the abrasive cloth described above can be reduced by the use of a combination of a hard abrasive cloth and an abrasive liquid containing the usual $CeO_2$-base abrasive having an average particle size ranging from about 0.5 to 2 µm, but fine surface defects are formed in this case.

In the method of the present invention, the conditions for polishing other than those discussed above such as polishing pressure, number of rotations and polishing time are not restricted to specific ones insofar as the usual polishing step can be performed, without any trouble. However, if the polishing pressure is too high, the abrasive cloth makes a sound of creaking and/or the glass substrate is damaged. Therefore, the polishing step is carried out at a polishing pressure of preferably less than 100 g/cm$^2$, and more preferably not more than 80 g/cm$^2$. Regarding the number of rotations, if it is too low, the polishing machine makes a noise of creaking, while it is too high, the polishing resistance and the processing resistance are extremely increased. Thus, the number of rotations preferably limited to the range of from about 15 to 60 rpm. In addition, the polishing time is closely related to the number of rotations, but if it is too short, the improvement of the surface roughness is liable to be insufficient, while if it is too long, any further improvement of the desired effect in proportion thereto is not expected any more. For this reason, the polishing time is preferably adjusted to the range of from about 150 to 1000 as expressed in terms of the product: polishing time (min)× the number of rotations (rpm).

Thus, a crystallized glass substrate for use in making a magnetic recording medium, which has an extremely low surface roughness and a smooth surface can easily be prepared by polishing a raw crystallized glass substrate or a chemically surface-strengthenable glass substrate, according to the method of the present invention.

The present invention will hereunder be described in more specifically with reference to the following non-limitative working Examples and Comparative Examples.

EXAMPLE 1

A large number of doughnut-like substrates each having an outer diameter of 65 mm, an inner diameter of 20 mm and a plate thickness of 0.68 mm were prepared by processing a lithium silicate crystallized glass substrate (TS-10SX comprising 70 to 80% of quartz-cristobalite and the balance of amorphous glass, available from OHARA Co., Ltd.) to desired outer and inner diameters and then lapping the glass substrate, according to the usual procedures for preparing a glass substrate for magnetic recording media.

Then 100 sheets of the foregoing doughnut-like substrate were fitted to a 16B double-sided polishing machine available from HAMAI Co., Ltd., using MIREK 801 (a $CeO_2$-base abrasive having an average particle size, $D_{50}$, of 1.5 μm) available from Mitsui Mining and Smelting Co., Ltd. as an abrasive and MHC15A (a foamed polyurethane) available from RODEL NITTA Co., Ltd. as an abrasive cloth so that the thickness reduced by the grinding on each side was 15 μm to thus give a crystallized glass substrate to be polished according to the method of the present invention.

The crystallized glass substrates (100 sheets) thus produced were fitted to a 16B double-sided polishing machine available from HAMAI Co., Ltd., and then the both side of these glass substrates were polished using an abrasive liquid containing, as an abrasive, CEP (a solid solution containing 100 parts by mass of cerium oxide and one part by mass of silicon oxide and having an average particle size, $D_{50}$, of 0.2 μm) available from Mitsui Mining and Smelting Co., Ltd. and MHC14E (a foamed polyurethane) available from RODEL NITTA Co., Ltd. as an abrasive cloth, under the following polishing conditions: a polishing pressure of 60 g/cm$^2$, a number of rotations of 30 rpm and a polishing time of 20 minutes. The surface roughness ($R_a$ and $R_{max}$) of the crystallized glass substrate thus polished were determined by observing an area thereof having a size of 2 μm×2 μm with A.F.M. (Atomic Force Microscope). The results thus obtained are summarized in the following Table 1.

COMPARATIVE EXAMPLE 1

The same procedures used in Example 1 were repeated except that MIREK SO (average particle size ($D_{50}$)=1.0 μm, $CeO_2$ content: 70%) available from Mitsui Mining and Smelting Co., Ltd. was substituted for the CEP abrasive used in Example 1 to give a polished crystallized glass substrate. Then the surface roughness of the resulting glass substrate was determined by repeating the same procedures used in Example 1. The results thus obtained are summarized in the following Table Table 1.

TABLE 1

| Ex. No. | Kind of Abrasive | Average Particle Size (μm) | $R_a$ (Å) | $R_{max}$ (Å) |
|---|---|---|---|---|
| 1 | CEP | 0.2 | 2.0 | 52 |
| 1* | MIREK SO | 1.0 | 4.5 | 110 |

*: Comparative Example

As will be seen from the date listed in Table 1, the surface roughness of the crystallized glass substrate could sufficiently be reduced by polishing the glass substrate using a $CeO_2$-base abrasive having an average particle size ($D_{50}$ of not more than 0.5 μm) smaller than that (1.0 μm) commonly used in the prior art, in a low concentration (not more than 1% by mass).

EXAMPLES 2 TO 9

The same procedures used in Example 1 were repeated except that the polishing conditions (polishing time, polishing pressure and number of rotations) used in Example 1 were changed to those specified in the following Table 2 to give a polished crystallized glass substrate. Then the surface roughness of the resulting glass substrate was determined by repeating the same procedures used in Example 1. The results thus obtained are summarized in the following Table 2.

TABLE 2

| Ex. No. | Polishing Time (min) | Polishing Pressure (g/cm$^2$) | No. of Rotations (rpm) | $R_a$ (Å) | $R_{max}$ (Å) |
|---|---|---|---|---|---|
| 2 | 20 | 75 | 30 | 1.8 | 50 |
| 3 | 20 | 30 | 30 | 2.0 | 52 |
| 4 | 20 | 30 | 50 | 2.1 | 54 |
| 5 | 15 | 60 | 40 | 1.7 | 32 |
| 6 | 15 | 60 | 30 | 2.2 | 54 |
| 7 | 15 | 60 | 20 | 2.1 | 55 |
| 8 | 10 | 60 | 20 | 2.4 | 56 |
| 9 | 5 | 60 | 30 | 3.0 | 80 |

EXAMPLES 10 to 15 AND COMPARATIVE EXAMPLE 2

The same procedures used in Example 1 were repeated except that the concentration of the CEP abrasive used in Example 1 was variously changed as specified in the following Table 3 and that a soap (MKP-98 available from Kyodo Yushi Co., Ltd.) as an additive was added to the abrasive liquid in a concentration specified in Table 3 to thus give a polished crystallized glass substrate. Then the surface roughness of the resulting glass substrate was determined by repeating the same procedures used in Example 1. The results thus obtained are summarized in the following Table 1, along with the data in Example 1.

TABLE 3

| Ex. No. | Concentration of Abrasive | Concentration of Soap | $R_a$ (Å) | $R_{max}$ (Å) |
|---|---|---|---|---|
| 2* | 2.0% by mass | 0 | 4.8 | 120 |
| 1 | 0.5% by mass | 0 | 2.0 | 58 |
| 10 | 0.1% by mass | 1% by mass | 1.6 | 33 |
| 11 | 0.1% by mass | 0.5% by mass | 1.5 | 30 |
| 12 | 0.1% by mass | 0 | 1.8 | 52 |
| 13 | 0.01% by mass | 1% by mass | 1.5 | 32 |
| 14 | 0.01% by mass | 0.5% by mass | 1.6 | 34 |
| 15 | 0.005% by mass | 1% by mass | 1.5 | 29 |

*: Comparative Example

As will be seen from the data listed in Table 3, when the concentration of the abrasive in the abrasive liquid is higher than 1% by mass, the surface roughness of the resulting crystallized glass substrate after polishing is not sufficiently reduced, while if it is extremely low, the surface roughness can be sufficiently reduced to a desired level. Moreover, the addition of a soap as an additive to the abrasive liquid permits further reduction of the surface roughness of the glass substrate due to the lubricating action of the additive.

EXAMPLES 16 TO 18

The same procedures used in Example 1 were repeated except that the concentration of the CEP abrasive used in Example 1 was changed to 0.005% by mass, that a soap (MKP-98 available from Kyodo Yushi Co., Ltd.) as an additive was added to the abrasive liquid in a concentration of 1% by mass and that the abrasive cloths were changed to those specified in the following Table 4 (MHC14E and Suba were available from RODEL NITTA Co., Ltd.; and N0038 was a suede type one available from Kanebo Ltd.) to thus give a polished crystallized glass substrate. Then the surface roughness of the resulting glass substrate was determined by repeating the same procedures used in Example 1. The results thus obtained are summarized in the following Table 4, along with the data observed in Example 15.

TABLE 4

| Ex. No. | Abrasive Cloth | $R_a$ (Å) | $R_{max}$ (Å) |
|---|---|---|---|
| 15 | MHC15A | 1.5 | 30 |
| 16 | MHC14E | 1.8 | 62 |
| 17 | Suba | 2.4 | 84 |
| 18 | N0038 | 2.2 | 80 |

The data listed in Table 4 clearly indicate that the surface roughness of the crystallized glass substrate can be further reduced by the use of a harder abrasive cloth in the polishing step.

EXAMPLE 19

A large number of doughnut-like substrates each having an outer diameter of 65 mm, an inner diameter of 20 mm and a plate thickness of 0.68 mm were prepared by processing a chemically surface-strengthenable aluminosilicate glass substrate (AH-1 available from Asahi Technoglass Co., Ltd.) to desired outer and inner diameters and then lapping the glass substrate, according to the usual procedures for preparing a glass substrate for magnetic recording media.

Then 100 sheets of the foregoing doughnut-like substrate were fitted to a 16B double-sided polishing machine available from HAMAI Ltd., using MIREK 801 (a $CeO_2$-base abrasive having an average particle size, $D_{50}$, of 1.5 μm) available from Mitsui Mining and Smelting Co., Ltd. as an abrasive and MHC15A (a foamed polyurethane) available from RODEL NITTA Co., Ltd. as an abrasive cloth so that the thickness reduced by the grinding on each side was 15 μm to thus give a chemically surface-strengthenable glass substrate to be polished according to the method of the present invention.

The chemically surface-strengthenable glass substrates (100 sheets) thus produced were fitted to a 16B double-sided polishing machine available from HAMAI Co., Ltd., and then the both side of these glass substrates were polished using an abrasive liquid containing, as an abrasive, CEP (a solid solution containing 100 parts by mass of cerium oxide and one part by mass of silicon oxide and having an average particle size, $D_{50}$, of 0.2 μm) available from Mitsui Mining and Smelting Co., Ltd. and MHC14E (a foamed polyurethane) available from RODEL NITTA Co., Ltd. as an abrasive cloth, under the following polishing conditions: a polishing pressure of 60 g/cm$^2$, a number of rotations of 30 rpm and a polishing time of 20 minutes. The surface roughness ($R_a$ and $R_{max}$) of the chemically surface-strengthenable glass substrate thus polished were determined by observing an area thereof having a size of 2 μm×2 μm with A.F.M. (Atomic Force Microscope). The results thus obtained are summarized in the following Table 5. As a result, there was not observed any brush mark-like linear unevenness on the surface at all.

COMPARATIVE EXAMPLE 3

The same procedures used in Example 19 were repeated except that MIREK SO (average particle size ($D_{50}$)=1.0 μm, $CeO_2$ content: 70%) available from Mitsui Mining and Smelting Co., Ltd. was substituted for the CEP and N0038 (a suede type abrasibe cloth) available from Kanebo Ltd. was substituted for the MHC14E used in Example 19 to give a polished chemically surface-strengthenable glass substrate. Then the surface roughness of the resulting glass substrate was determined by repeating the same procedures used in Example 19. The results thus obtained are summarized in the following Table 5. As a result, there was observed brush mark-like linear unevenness on the surface.

TABLE 5

| Ex. No. | Kind of Abrasive; Average Particle Size (μm) | Material for Abrasive cloth | $R_a$ (Å) | $R_{max}$ (Å) |
|---|---|---|---|---|
| 19 | CEP; 0.2 | Foamed Polyurethane | 1.5 | 50 |
| 3* | MIREK SO; 1.0 | Suedo Type One | 5.6 | 120 |

*: Comparative Example

As will be seen from the date listed in Table 5, the surface roughness of the chemically surface-strengthenable glass substrate could sufficiently be reduced by polishing the glass substrate using a $CeO_2$-base abrasive having an average particle size ($D_{50}$ of not more than 0.5 μm) smaller than that (1.0 μm) commonly used in the prior art in a low concentration (not more than 1% by mass).

EXAMPLES 20 TO 27

The same procedures used in Example 19 were repeated except that the polishing conditions (polishing time, polishing pressure and number of rotations) used in Example 19 were changed to those specified in the following Table 6 to give a polished chemically surface-strengthenable glass substrate. Then the surface roughness of the resulting glass substrate was determined by repeating the same procedures used in Example 19. The results thus obtained are summarized in the following Table Table 6.

TABLE 6

| Ex. No. | Polishing Time(min) | Polishing Pressure (g/cm$^2$) | No. of Rotations (rpm) | $R_a$ (Å) | $R_{max}$ (Å) |
|---|---|---|---|---|---|
| 20 | 20 | 75 | 30 | 1.4 | 48 |
| 21 | 20 | 30 | 30 | 1.6 | 54 |
| 22 | 20 | 30 | 50 | 1.6 | 52 |
| 23 | 15 | 60 | 40 | 1.4 | 46 |
| 24 | 15 | 60 | 30 | 1.7 | 54 |
| 25 | 15 | 60 | 20 | 1.8 | 57 |
| 26 | 10 | 60 | 20 | 2.1 | 58 |
| 27 | 5 | 60 | 30 | 2.4 | 61 |

EXAMPLES 28 TO 33 AND COMPARATIVE EXAMPLE 4

The same procedures used in Example 19 were repeated except that the concentration of the CEP abrasive used in Example 19 was variously changed as specified in the following Table 7 and that a soap (MKP-98 available from Kyodo Yushi Co., Ltd.) as an additive was added to the abrasive liquid in a concentration specified in Table 7 (in some cases, the soap was not added) to thus give a polished chemically surface-strengthenable glass substrate. Then the surface roughness of the resulting glass substrate was determined by repeating the same procedures used in Example 19. The results thus obtained are summarized in the following Table 7, along with the data observed in Example 19.

TABLE 7

| Ex. No. | Concentration of Abrasive | Concentration of Soap | $R_a$ (Å) | $R_{max}$ (Å) |
|---|---|---|---|---|
| 4* | 2.0% by mass | 0 | 4.9 | 124 |
| 19 | 0.5% by mass | 0 | 1.6 | 54 |
| 28 | 0.1% by mass | 1% by mass | 1.4 | 51 |
| 29 | 0.1% by mass | 0.5% by mass | 1.4 | 49 |
| 30 | 0.1% by mass | 0 | 1.5 | 52 |
| 31 | 0.01% by mass | 1% by mass | 1.3 | 53 |
| 32 | 0.01% by mass | 0.5% by mass | 1.4 | 50 |
| 33 | 0.005% by mass | 1% by mass | 1.4 | 52 |

*: Comparative Example

As will be seen from the data listed in Table 7, when the concentration of the abrasive in the abrasive liquid is higher than 1% by mass, the surface roughness of the resulting chemically surface-strengthenable glass substrate after polishing is not sufficiently reduced, while if it is extremely low, the surface roughness can be sufficiently reduced to a desired level. Moreover, the addition of a soap as an additive to the abrasive liquid permits further reduction of the surface roughness of the glass substrate due to the lubricating action of the additive.

EXAMPLES 34 TO 36

The same procedures used in Example 19 were repeated except that the concentration of the CEP abrasive used in Example 19 was changed to 0.005% by mass, that a soap (MKP-98 available from Kyodo Yushi Co., Ltd.) as an additive was added to the abrasive liquid in a concentration of 1% by mass and that the abrasive cloths were changed to those specified in the following table 8 (MHC14E and Suba were available from RODEL NITTA Co., and N0038 was a suede type one available from Kanebo Ltd.) to thus give a polished chemically surface-strengthenable glass substrate. Then the surface roughness of the resulting glass substrate was determined by repeating the same procedures used in Example 19. The results thus obtained are summarized in the following Table 8, along with the data observed in Example 33.

TABLE 8

| Ex. No. | Abrasive Cloth | $R_a$ (Å) | $R_{max}$ (Å) |
|---|---|---|---|
| 33 | MHC15A | 1.3 | 48 |
| 34 | MHC14E | 1.4 | 52 |
| 35 | Suba | 2.3 | 63 |
| 36 | N0038 | 2.7 | 68 |

The data listed in table 8 clearly indicate that the surface roughness of the chemically surface-strengthenable glass substrate can be further reduced by the use of a harder abrasive cloth in the polishing step.

What is claimed is:

1. A method for preparing a glass substrate for use in making a magnetic recording medium, comprising a final step of polishing the glass substrate with an abrasive cloth and an abrasive liquid containing a $CeO_2$-based abrasive having an average particle size of not more than 0.5 μm in an amount of not more than 1% by mass and a soap as an additive.

2. The method as set forth in claim 1 wherein the glass substrate for use in making a magnetic recording medium is a crystallized glass substrate or a chemically surface-strengthenable glass substrate.

3. The method as set forth in claim 2, wherein the abrasive liquid containing a $CeO_2$-based abrasive has an average particle size of not more than 0.3 μm in an amount of not more than 0.5% by mass.

4. The method as set forth in claim 3 wherein the $CeO_2$-base abrasive is a solid solution consisting of 100 parts by mass of cerium oxide and 0.1 to 10 parts by mass of silicon oxide.

5. The method as set forth in claim 3 wherein the abrasive cloth is one made of a hard foamed polyurethane.

6. The method as set forth in claim 4, wherein the abrasive cloth is one made of a hard foamed polyurethane.

7. The method as set forth in claim 2 wherein the $CeO_2$-base abrasive is a solid solution consisting of 100 parts by mass of cerium oxide and 0.1 to 10 parts by mass of silicon oxide.

8. The method as set forth in claim 7, wherein the abrasive cloth is one made of a hard foamed polyurethane.

9. The method as set forth in claim 2 wherein the abrasive cloth is one made of a hard foamed polyurethane.

10. The method as set forth in claim 1, wherein the abrasive liquid containing a $CeO_2$-based abrasive has an average particle size of not more than 0.3 μm in an amount of not more than 0.5% by mass.

11. The method as set forth in claim 10 wherein the $CeO_2$-base abrasive is a solid solution consisting of 100 parts by mass of cerium oxide and 0.1 to 10 parts by mass of silicon oxide.

12. The method as set forth in claim 11, wherein the abrasive cloth is one made of a hard foamed polyurethane.

13. The method as set forth in claim 10 wherein the abrasive cloth is one made of a hard foamed polyurethane.

14. The method as set forth in claim 1 wherein the $CeO_2$-base abrasive is a solid solution consisting of 100 parts by mass of cerium oxide and 0.1 to 10 parts by mass of silicon oxide.

15. The method as set forth in claim 14 wherein the abrasive cloth is one made of a hard foamed polyurethane.

16. The method as set forth in claim 1 wherein the abrasive cloth is one made of a hard foamed polyurethane.

* * * * *